United States Patent
Zhang (10) Patent No.: US 8,670,926 B2
(45) Date of Patent: Mar. 11, 2014

(54) NAVIGATION DEVICE AND CONTROL METHOD THEREOF

(75) Inventor: Hua-En Zhang, Shanghai (CN)

(73) Assignees: MiTAC International Corp., Kuei San Township (TW); MiTAC Research (Shanghai) Ltd., Shanghai (CN)

( * ) Notice: Subject to any disclaimer, the term of this patent is extended or adjusted under 35 U.S.C. 154(b) by 104 days.

(21) Appl. No.: 13/224,831

(22) Filed: Sep. 2, 2011

(65) Prior Publication Data

US 2013/0035854 A1    Feb. 7, 2013

(30) Foreign Application Priority Data

Aug. 1, 2011  (CN) .......................... 2011 1 0218555

(51) Int. Cl.
*G01C 21/30* (2006.01)
*G01C 21/32* (2006.01)

(52) U.S. Cl.
USPC ............................ 701/409; 345/619; 701/455

(58) Field of Classification Search
USPC .................. 715/863, 823; 701/208, 455, 532; 707/796; 345/419
See application file for complete search history.

(56) References Cited

U.S. PATENT DOCUMENTS

| | | | |
|---|---|---|---|
| 6,049,755 A * | 4/2000 | Lou et al. ...................... 701/455 |
| 6,710,774 B1 * | 3/2004 | Kawasaki et al. ............. 345/419 |
| 7,671,764 B2 * | 3/2010 | Uyeki et al. ............. 340/995.13 |
| 8,078,641 B2 * | 12/2011 | Mao et al. ...................... 707/796 |
| 2009/0187333 A1 * | 7/2009 | Mueller ........................ 701/200 |
| 2011/0106439 A1 * | 5/2011 | Huang et al. .................. 701/208 |
| 2011/0302532 A1 * | 12/2011 | Missig .......................... 715/823 |
| 2012/0192117 A1 * | 7/2012 | Migos et al. .................. 715/863 |

* cited by examiner

*Primary Examiner* — Thomas Black
*Assistant Examiner* — Robert Payne
(74) *Attorney, Agent, or Firm* — Wang Law Firm, Inc.; Li K. Wang; Stephen Hsu (57) ABSTRACT

A navigation device and a control method thereof are disclosed. The navigation device control method includes the steps of using a display unit to display at least one road map thereon; using a processing unit to determine whether a moving speed of the navigation device is larger than a speed threshold value; and if the moving speed of the navigation device is larger than the speed threshold value, the processing unit controlling the display unit to adjust a manner in which the road map is displayed on the display unit.

10 Claims, 6 Drawing Sheets

NAVIGATION DEVICE AND CONTROL METHOD THEREOF

CROSS-REFERENCE TO RELATED APPLICATION

This application claims the benefit of China Patent Application No. 201110218555.X, filed on Aug. 1, 2011, in the State Intellectual Property Office of the People's Republic of China, the disclosure of which is incorporated herein by reference.

BACKGROUND OF THE INVENTION

1. Field of the Invention

The present invention relates to a navigation device and a control method thereof; and more particularly to a navigation device and a control method thereof that are able to determine a manner of displaying a road map based on a driving speed.

2. Description of the Related Art

In the past, Global Positioning System (GPS) is mainly used in airplane/ship navigation or geographical surveying. However, the application of GPS system has now gradually extended into people's daily life. For example, GPS system has replaced the old radio beacon used in aerial navigation, or is used along with electronic maps for car navigation to enable a driver to easily locate desired road signs, or is used to locate someone's current position, or is used along with a satellite locator by skiers, hikers, nature-lovers and climbers to locate destination and the shortest route to home. Therefore, it has become an important trend in technological fields to develop GPS system with more functions. Currently, GPS system is most widely developed and applied in car navigation.

In displaying roads surrounding the driver (i.e. the user), the conventional car navigation systems tend to display all the surrounding roads in the display screen. However, the user is not able to determine which road information is useful to him or her and which navigation message is meaningless to him or her. Thus, the user tends to take time to watch the display screen for reading and determining the displayed messages and becomes distracted from driving to easily result in an accident.

U.S. Pat. No. 6,049,755 discloses a method for displaying current vehicle location using a navigation system, in which the navigation system determines whether to display cross streets based on the importance of the cross streets. When the user's car is moving on a road that has an importance higher than a threshold value, the navigation system would determine not to display cross streets that have importance lower than the threshold value. However, up to date, no one has suggested the technique of adjusting the information displayed on the navigation device according to the driving speed. Therefore, it is possible a user driving at a high speed is distracted from driving when trying to watch the complicate information displayed on the navigation device, and is therefore subject to the danger of an accident.

SUMMARY OF THE INVENTION

A primary object of the present invention is to provide a navigation device and control method thereof, so that a user would not become distracted from driving due to watching too many complicate road messages on the navigation device and can therefore be protected against traffic accident.

To achieve the above and other objects, the navigation device according to the present invention includes a display unit and a processing unit. The display unit displays at least one road map thereon; and the processing unit is electrically connected to the display unit and determines whether a moving speed of the navigation device is larger than a speed threshold value. If it is determined the moving speed of the navigation device is larger than the speed threshold value, the processing unit would then control the display unit to adjust a manner of displaying the road map.

The processing unit further adjusts the manner of displaying the road map based on a scale in which the road map is shown on the display unit.

The processing unit further adjusts the manner of displaying the road map based on weighted values assigned to different roads shown in the road map.

The processing unit further adjusts the manner of displaying the road map based on a relative position-based spatial relation between the navigation device and the roads shown in the road map.

According to an embodiment of the present invention, the processing unit adjusts the road map displaying manner by fading some parts of the road map.

According to an embodiment of the present invention, the processing unit fades some parts of the road map by showing those parts in phantom lines.

According to an embodiment of the present invention, the processing unit fades some parts of the road map by showing those parts in a reduced level of brightness.

According to an embodiment of the present invention, the processing unit fades some parts of the road map by showing those parts in a low contrast with the road map.

According to an embodiment of the present invention, the processing unit fades some parts of the road map by showing those parts in a color gradient.

According to another embodiment of the present invention, the processing unit adjusts the road map displaying manner by not displaying some parts of the road map.

To achieve the above and other objects, the control method according to the present invention is applicable to a navigation device and includes the steps of using a display unit to display at least one road map thereon; using a processing unit to determine whether a moving speed of the navigation device is larger than a speed threshold value; and if the moving speed of the navigation device is larger than the speed threshold value, the processing unit controlling the display unit to adjust a manner in which the road map is displayed on the display unit.

The navigation device control method of the present invention further includes the following step: the processing unit adjusting the manner of displaying the road map based a scale in which the road map is shown in the display unit.

The navigation device control method of the present invention further includes the following step: the processing unit adjusting the manner of displaying the road map based weighted values assigned to different roads shown in the road map.

The navigation device control method of the present invention further includes the following step: the processing unit adjusting the manner of displaying the road map based a relative position-based spatial relation between the navigation device and the roads shown in the road map.

According to an embodiment of the navigation device control method, the processing unit adjusts the road map displaying manner by fading some parts of the road map.

According to an embodiment of the navigation device control method, the processing unit fades some parts of the road map by showing those parts in phantom lines.

According to an embodiment of the navigation device control method, the processing unit fades some parts of the road map by showing those parts in a reduced level of brightness.

According to an embodiment of the navigation device control method, the processing unit fades some parts of the road map by showing those parts in a low contrast with the road map.

According to an embodiment of the navigation device control method, the processing unit fades some parts of the road map by showing those parts in a color gradient.

According to another embodiment of the navigation device control method, the processing unit adjusts the road map displaying manner by not displaying some parts of the road map.

With the above arrangements, the navigation device and the control method thereof according to the present invention have one or more of the following advantages:

(1) The navigation device and the control method thereof are able to determine the mode or manner for displaying a road map according to the driving speed, and therefore allow a user to more clearly recognize important road messages provided by the navigation device.

(2) The navigation device and the control method thereof are able to determine the mode or manner for displaying a road map according to the importance of different roads shown in the road map, and therefore protect the user against traffic accidents due to watching the complicate road messages on the navigation device and becoming distracted from driving.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
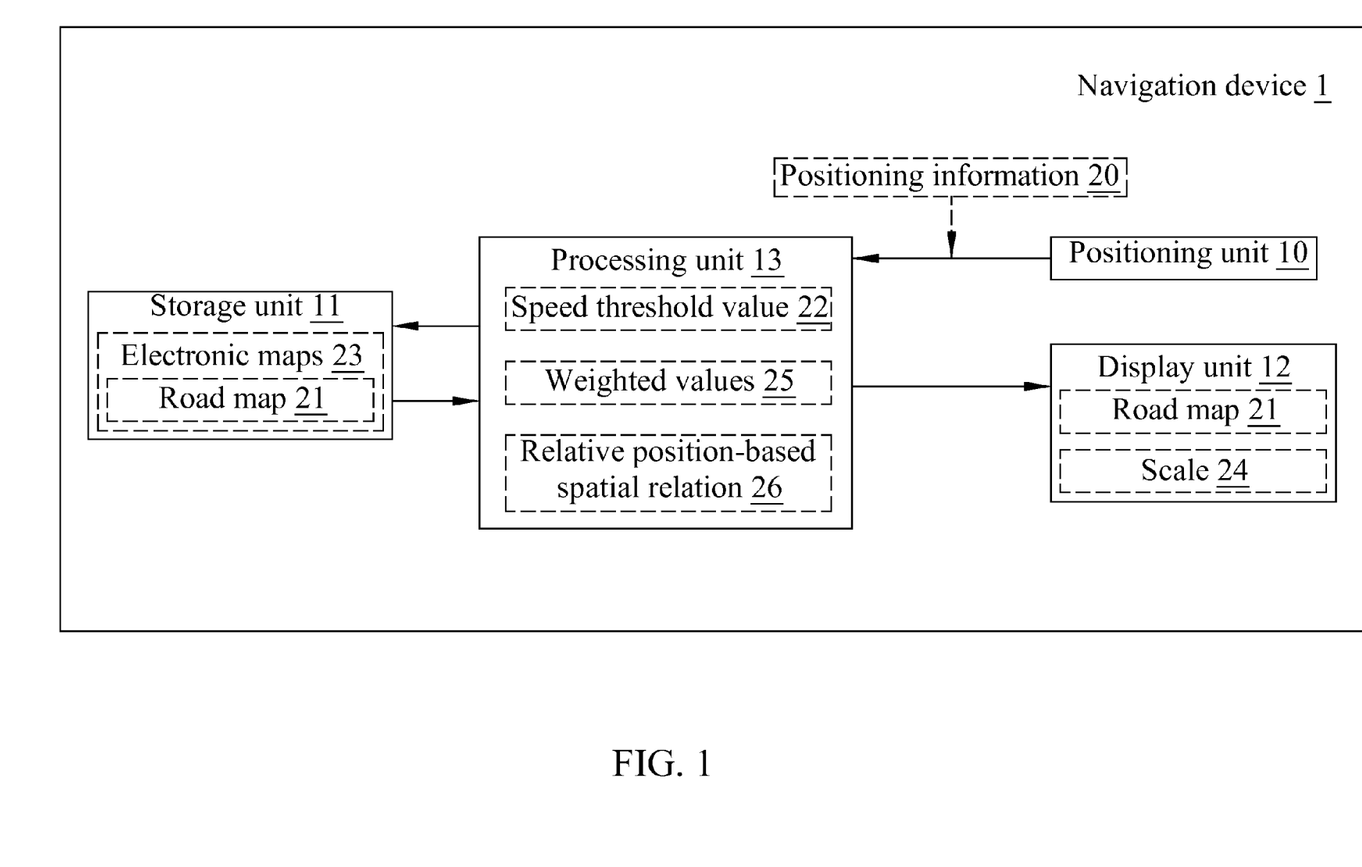
FIG. 1 is a block diagram of a navigation device according to the present invention.

Please refer to FIG. 1 that is a block diagram of a navigation device 1 according to the present invention. As shown, the navigation device 1 of the present invention includes a positioning unit 10, a storage unit 11, a display unit 12, and a processing unit 13 electrically connected to the positioning unit 10, the storage unit 11 and the display unit 12.

The positioning unit 10 determines a current location of the navigation device 1 and provides corresponding positioning information 20. In a preferred embodiment of the present invention, the positioning unit 10 is a Global Positioning System (GPS) for receiving a satellite signal and computing the same to determine the current location of the navigation device 1 and provide the positioning information 20. The display unit 12 displays at least one road map 21 thereon. The processing unit 13 uses the positioning information as a basis to determine whether a moving speed of the navigation device 1 is larger than a speed threshold value 22. When the moving speed of the navigation device 1 is larger than the speed threshold value 22, the processing unit 13 will then control the display unit 12 to adjust a manner in which the road map 21 is displayed on the display unit 12. In a preferred embodiment, the processing unit 13 can be a central processing unit (CPU) or a micro-processing unit; and the storage unit 13 can be any one of various currently available storing media, such as an embedded memory, an external memory (card), a disk, or a compact disk (CD), and has a plurality of electronic maps 23 stored therein. The above-mentioned at least one road map 21 is also included in the electronic maps 23. Further, the display unit 12 can be any one of various currently available display devices, such as a liquid crystal screen, a projector, an organic light-emitting-diode (OLED) display, or an electronic paper display, for displaying the electronic maps 23 and the at least one road map 21 thereon.

In other preferred embodiments of the present invention, the processing unit 13 can further use a scale 24 in which the road map 21 is displayed on the display unit 12 as a basis to adjust the manner of displaying the road map 21; or use weighted values 25 assigned to different roads shown in the road map 21 as a basis to adjust the manner of displaying the road map 21; or use a relative position-based spatial relation 26 between the navigation device 1 and roads in the road map 21 as a basis to adjust the manner of displaying the road map 21.

Figure 2:
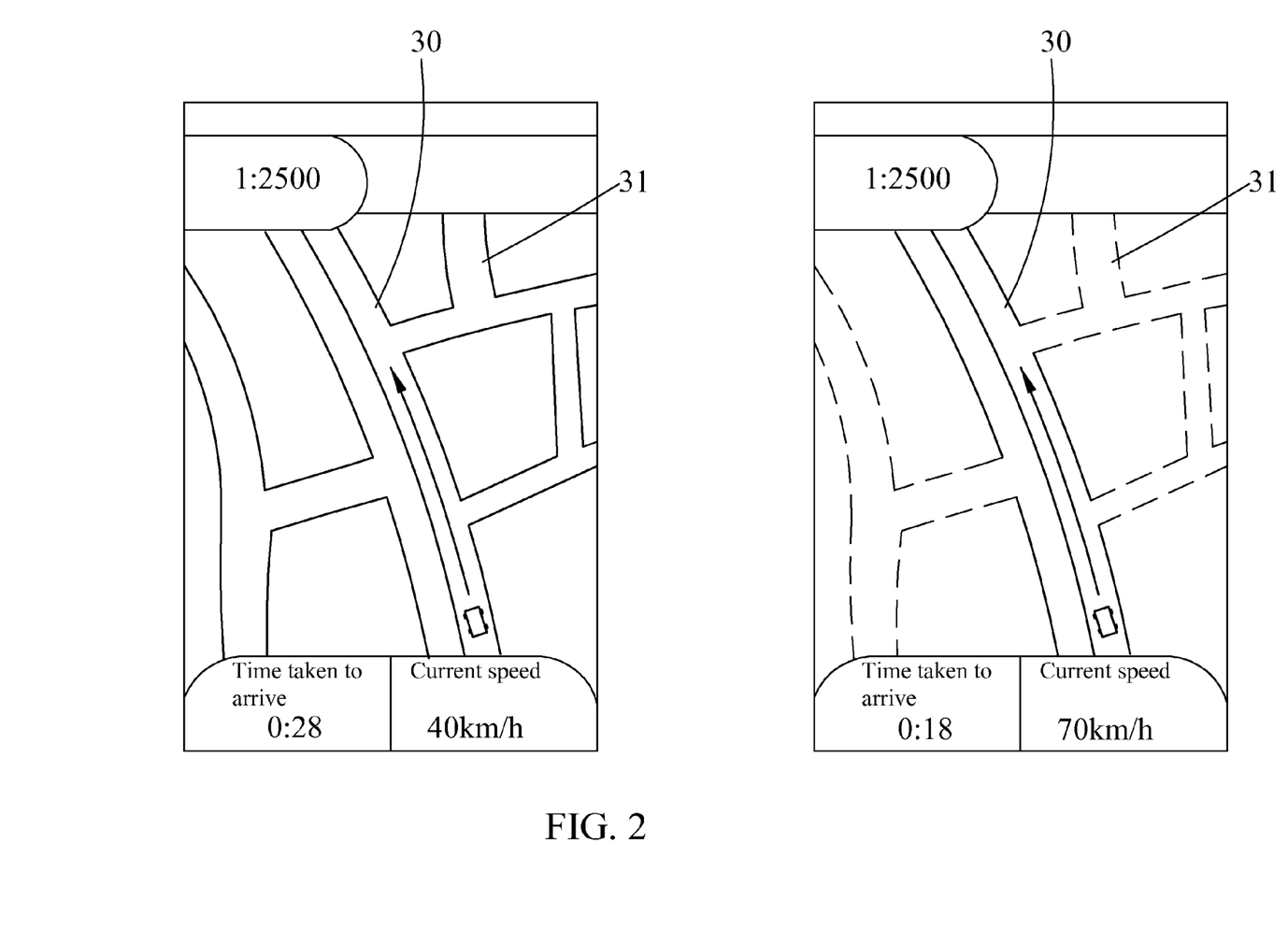
FIG. 2 shows a first embodiment of the navigation device according to the present invention.

Please refer to FIG. 2. FIG. 2 shows a first embodiment of the navigation device 1 of the present invention. As shown, when viewing in front of FIG. 2, the left part thereof shows the navigation device 1 has a moving speed smaller than the speed threshold value 22. It is supposed a user driving at such a speed might possibly leave the current road 30 and turn into a surrounding road 31. Therefore, the processing unit 13 controls the display unit 12 to display both the current road 30 and the surrounding road 31, as a basic manner of displaying the road map 21 having been mentioned above, so that the user can easily recognize the junction of the current road 30 and the surrounding road 31. However, when the user accelerates and the navigation device 1 now has an increased moving speed larger than the speed threshold value 22, as shown in the right part of FIG. 2, it is supposed the user does not intend to leave the current road 30 for turning into the surrounding road 31. Therefore, the processing unit 13 controls the display unit 12 to adjust the manner of displaying the road map by displaying only the current road 30 while fading the surrounding road 31, so that the user is not distracted from driving by watching the complicate road map displayed on the navigation device 1.

In the event the user further accelerates and the navigation device now has an increased moving speed far beyond the speed threshold value 22, such as twice as higher as the speed threshold value 22, the processing unit 13 will further control the display unit 12 to display only the current road 30 without showing the surrounding road 31, enabling the user to concentrate on driving without being distracted by the navigation device 1.

Figure 3:
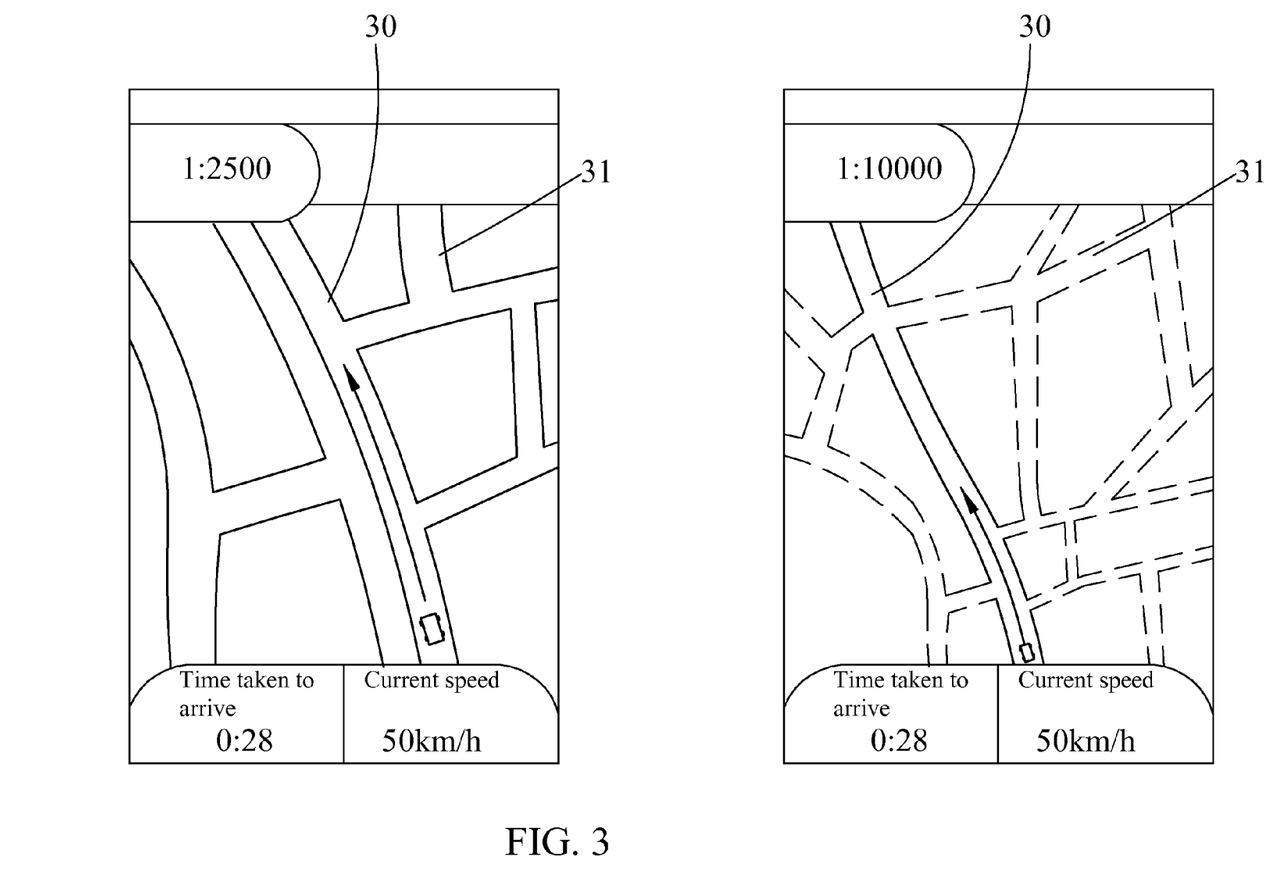
FIG. 3 shows a second embodiment of the navigation device according to the present invention.

Please refer to FIG. 3 that shows a second embodiment of the navigation device 1 of the present invention. As shown, when the navigation device 1 has a moving speed exceeding the speed threshold value 22, the processing unit 13 further determines whether the current scale 24 in which the current road 30 and the surrounding road 31 are displayed on the display unit 12 exceeds a scale threshold value, such as 1:5000. When the scale 24 exceeds the scale threshold value, such as 1:2500 as that shown in the left part of FIG. 3, that is, the display unit 12 displays a small area with high details, the processing unit 13 would control the display unit 12 to display both the current road 30 and the surrounding road 31. On the other hand, when the scale 24 is smaller than the scale threshold value, such as 1:10000 as that shown in the right part of FIG. 3, the processing unit 13 would control the display unit 12 to display only the current road 30 and fade the surrounding road 31.

Figure 4:
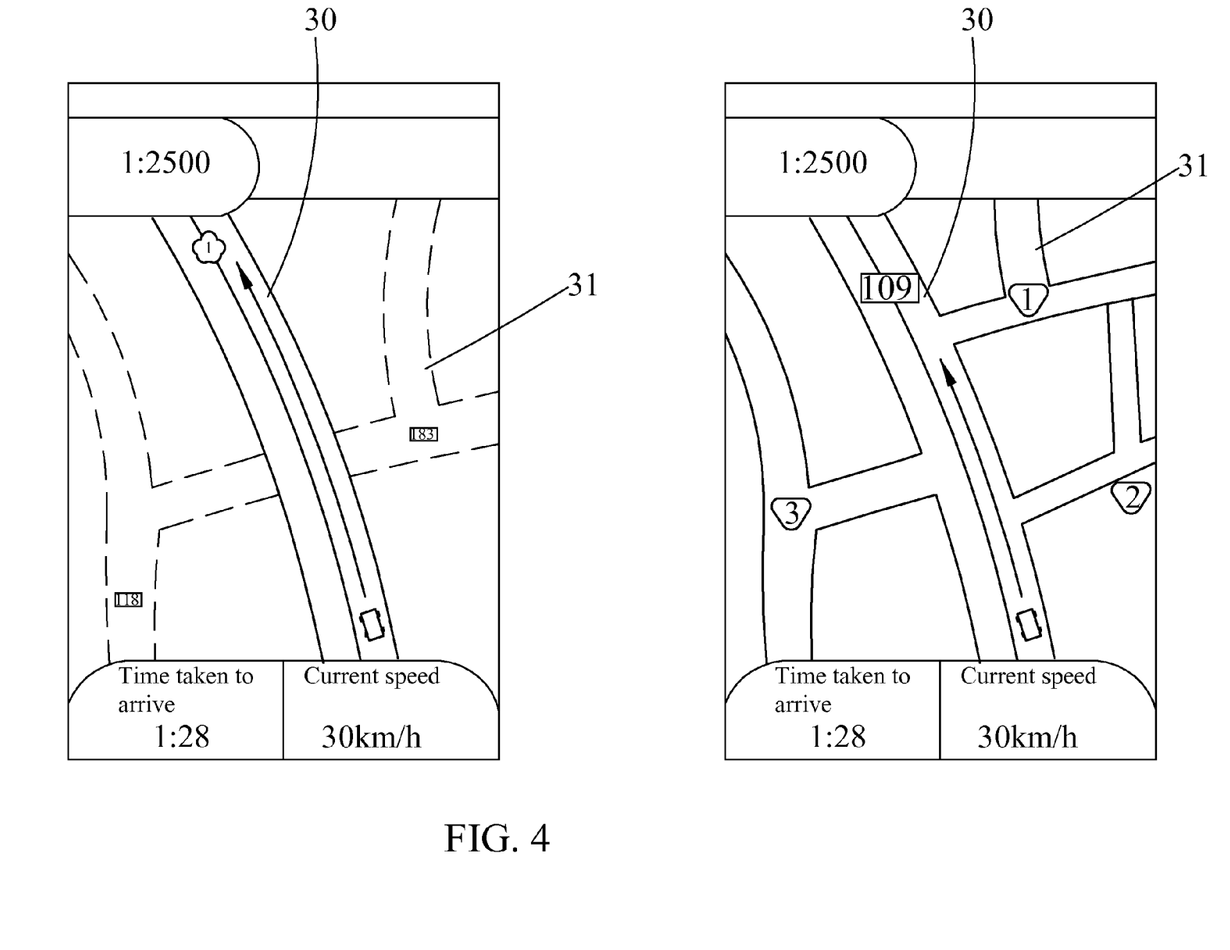
FIG. 4 shows a third embodiment of the navigation device according to the present invention.

Please also refer to FIG. 4 that shows a third embodiment of the navigation device 1 of the present invention. As shown in FIG. 4, when the navigation device 1 has a moving speed lower than the speed threshold value 22, the processing unit 13 further determines a relation between the weighted value assigned to the current road 30 and the weighted value assigned to the surrounding road 31, and uses this relation as a basis to adjust the display manner of the display unit 12. The weighted value assigned to the current road 30 and to the surrounding road 31 are determined according to the importance of the roads. For example, a freeway is assigned the highest weighted value while an express road and an interstate highway are assigned the second highest and the third highest weighted value, respectively. In the left part of FIG. 4, when the current road 30 has a weighted value higher than that of the surrounding road 31, that is, the current road 30 has an importance higher than that of the surrounding road 31, the processing unit 13 would control the display unit 12 to display only the current road 30 while fading the surrounding road 31. On the other hand, as shown in the right part of FIG. 4, when the current road 30 has a weighted value smaller than that of the surrounding road 31, that is, the current road 30 has an importance lower than that of the surrounding road 31, the processing unit 13 would then control the display unit 12 to display both the current road 30 and the surrounding road 31. It is to be noted that the present invention changes the road map display manner not only at the time the navigation device 1 has a moving speed exceeding the speed threshold value 22, but also when the moving speed of the navigation device 1 decreases to become lower than the speed threshold value 22.

Figure 5:
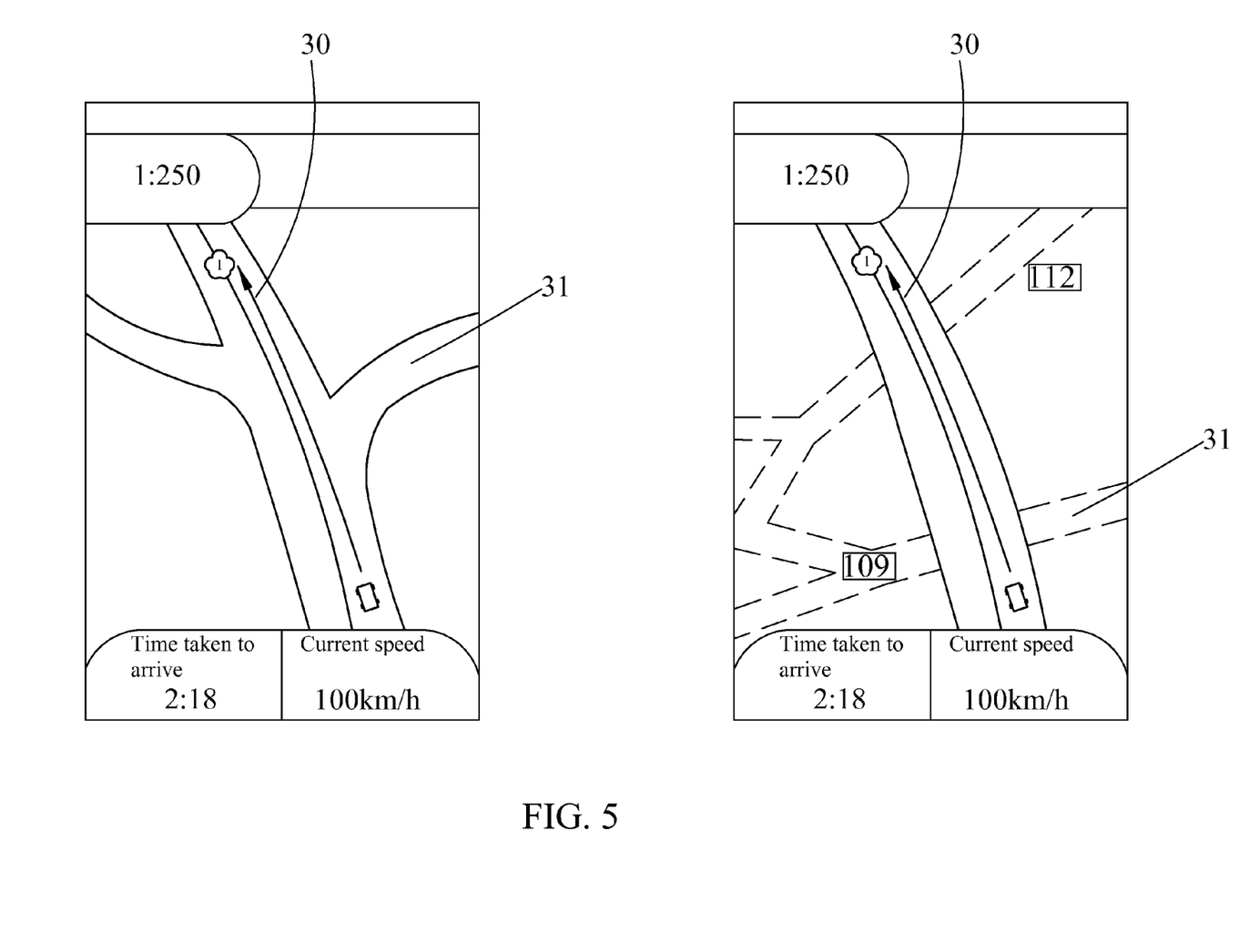
FIG. 5 shows a fourth embodiment of the navigation device according to the present invention.

Please refer to FIG. 5 that shows a fourth embodiment of the navigation device 1 of the present invention. As shown, when the navigation device 1 has a moving speed exceeding the speed threshold value 22, the processing unit 13 further determines a relative position-based spatial relation between the surrounding road 31 to the navigation device 1 and uses this relation as a basis to adjust the manner of displaying the surrounding road 31 on the display unit 12. As can be seen in the left part of FIG. 5, the surrounding road 31 is an exit ramp of the current road 30, which is a freeway in this embodiment. Therefore, even if the navigation device 1 currently has a moving speed much higher than the speed threshold value 22, the processing unit 13 determines the user might want to leave the current road 30 via this exit ramp and therefore controls the display unit 12 to display the surrounding road 31 while not displaying or fading other surrounding roads. On the other hand, as can be seen in the right part of FIG. 5, when the surrounding road 31 is a smaller road below the current road 30, which is a freeway in this embodiment, the processing unit 13 would determine it is impossible for the user to turn into this surrounding road 31 from the current road 30 because there is a very low spatial relation between the current road 30 and the surrounding road 31 in view of the relative position between them, and therefore controls the display unit 12 to fade or not to display the surrounding road 31.

It is noted the processing unit 13 adjusts the surrounding road display manner in two ways, including fading the surrounding road 31 and not displaying the surrounding road 31. In the case of fading the surrounding road 31, the surrounding road 31 can be displayed on the display unit 12 in different ways, including, but not limited to, being delineated with phantom lines, or having reduced brightness, or having a low contrast with the current road 30, or showing a color gradient; and one of ordinary skill in the art can easily achieve the fading effect by using other ways without departing from the scope of the present invention.

The following table lists different manners of displaying a surrounding road in the present invention based on the driving speed, the scale of the road map, the road importance, and the relative position-based spatial relation between the surrounding road and the navigation device:

|  | Driving Speed | Scale of Road Map | Comparison in Importance Between Current Road (C) and Surrounding Road (S) | Relative Position-based Spatial Relation Between Current Road and Surrounding Road | Manner of Displaying Surrounding Road |
|---|---|---|---|---|---|
| 1 | High | Small | C > S | High | Faded |
| 2 | High | Small | C = S | High | Displayed |
| 3 | High | Small | C < S | High | Displayed |
| 4 | High | Small | C > S | Low | Not displayed |
| 5 | High | Small | C = S | Low | Not displayed |
| 6 | High | Small | C < S | Low | Faded |
| 7 | High | Large | C > S | High | Displayed |
| 8 | High | Large | C = S | High | Displayed |
| 9 | High | Large | C < S | High | Displayed |
| 10 | High | Large | C > S | Low | Faded |
| 11 | High | Large | C = S | Low | Faded |
| 12 | High | Large | C < S | Low | Faded |
| 13 | Low | Small | C > S | High | Displayed |
| 14 | Low | Small | C = S | High | Displayed |
| 15 | Low | Small | C < S | High | Displayed |
| 16 | Low | Small | C > S | Low | Faded |
| 17 | Low | Small | C = S | Low | Faded |
| 18 | Low | Small | C < S | Low | Faded |
| 19 | Low | Large | C > S | High | Displayed |
| 20 | Low | Large | C = S | High | Displayed |
| 21 | Low | Large | C < S | High | Displayed |
| 22 | Low | Large | C > S | Low | Not displayed |
| 23 | Low | Large | C = S | Low | Faded |
| 24 | Low | Large | C < S | Low | Faded |

It is to be noted that the conditions and the manners of displaying the surrounding road as listed in the above table are only examples, and one of ordinary skill in the art can easily carry out any change or modification in the detailed conditions, based on which the manner of displaying the surrounding road is determined, without departing from the spirit of the present invention.

Figure 6:
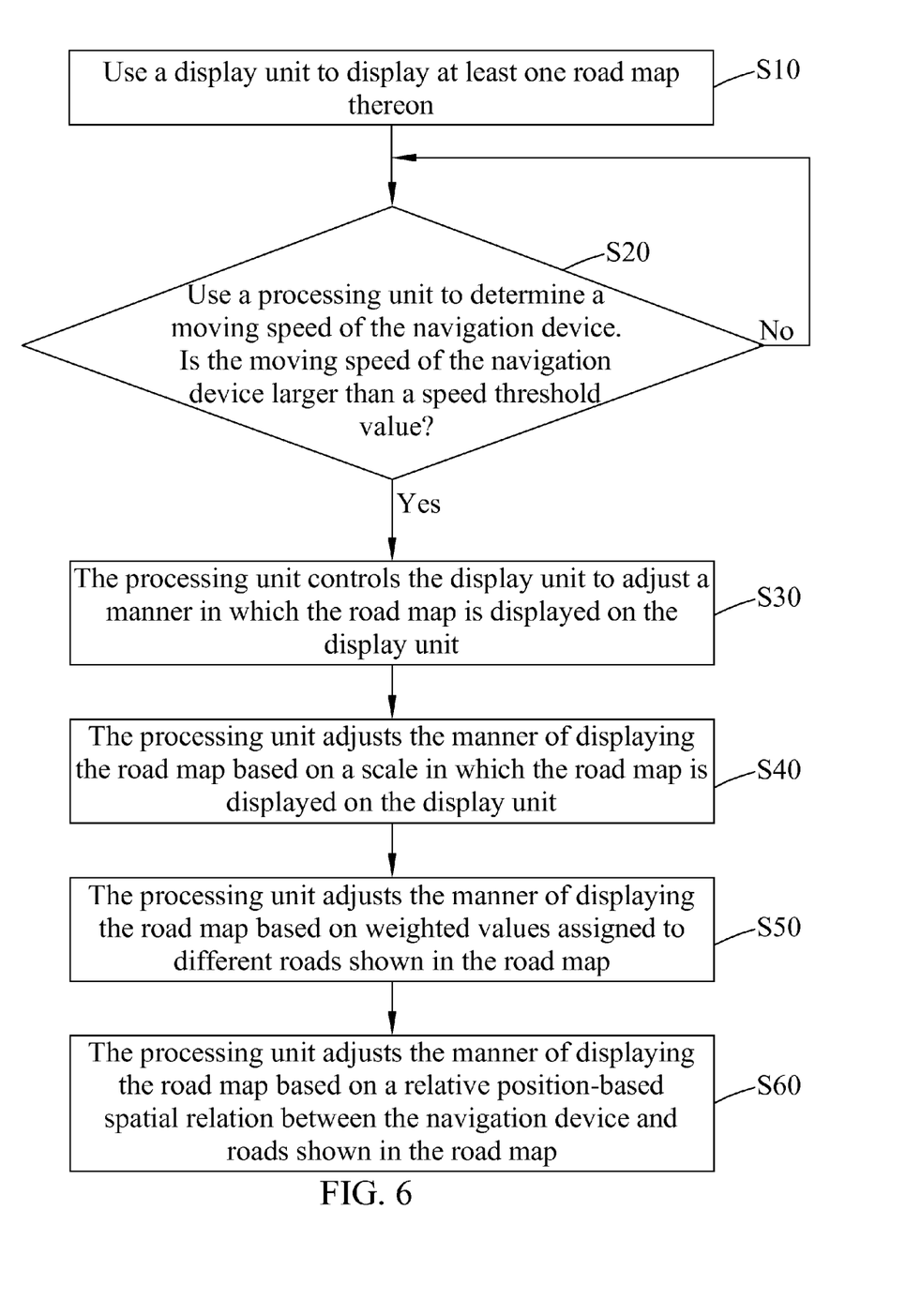
FIG. 6 is a flowchart showing the steps included in a navigation device control method according to the present invention.

While the above description of the navigation device of the present invention has also described a concept of controlling the navigation device, the following will still give a more detailed description of the navigation device control method with reference to a flowchart shown in FIG. 6.

Please refer to FIG. 6 that is a flowchart showing the steps included in the control method of a navigation device according to the present invention. As shown, the navigation device control method includes the following steps:

S10: Use a display unit to display at least one road map thereon;

S20: Use a processing unit to determine whether the navigation device has a moving speed larger than a speed threshold value;

S30: If yes (i.e. the moving speed of the navigation device is larger than the speed threshold value), the processing unit controls the display unit to adjust a manner in which the road map is displayed on the display unit;

S40: Use the processing unit to adjust the manner of displaying the road based on a scale in which the road map is displayed on the display unit;

S50: Use the processing unit to adjust the manner of displaying the road map based on weighted values assigned to different roads shown on the road map; and S60: Use the processing unit to adjust the manner of displaying the road map based on a relative position-based spatial relation between the roads shown on the road map and the navigation device.

Since the details and the implementation of the above steps have already been recited in the previous description of the navigation device, they are not repeated herein.

As described above, the control method of the present invention can be applied to implement a navigation device. In addition, the present invention can also be implemented via a storage medium. The storage medium has a program code stored therein. When a processing unit reads and executes the program code, it is able to implement the illustrated navigation device control method of the present invention. On the other hand, the present invention can also be implemented using a computer program product. The computer program product is a program code, which can be read and executed by a processing unit to thereby enable implementation of the illustrated navigation device control method of the present invention. The computer program product can be selectively downloaded from the web or transmitted to the processing unit in other ways.

It is to be noted that the present invention is described with some preferred embodiments thereof and, to avoid repetition, other possible combinations of these preferred embodiments are not described in details herein. However, it is understood by one of ordinary skill in the art that not all the described units or components are necessarily provided; and some other known modules or components with more details are also possibly included to implement the present invention. The modules or components used to implement the present invention can be otherwise omitted or modified depending on actual need in design, and there is still possibility of having other modules or components existed between any two modules.

In conclusion, the navigation device and the control method thereof according to the present invention are able to determine the mode or manner for displaying a road map according to the driving speed, the scale of the road map shown on the display unit, the importance of different roads shown in the road map, and the relative position-based spatial relation between the navigation device and different roads in the displayed road map, and therefore allow a user to more clearly recognize important road messages provided by the navigation device, which in turn protects the user against traffic accidents due to watching the complicate road messages on the navigation device and becoming distracted from driving.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A navigation device, comprising:
a display unit for displaying at least one road map thereon, each of the road maps having a current scale and consisting of a current road and surrounding roads; and
a processing unit being electrically connected to the display unit and determining whether a moving speed of the navigation device is larger than a speed threshold value;
wherein when the processing unit determines the moving speed of the navigation device is larger than the speed threshold value, the processing unit controls the display unit to adjust the road map by fading or not displaying the surrounding roads of the road map while only displaying the current road of the road map, using one or more of the following criteria:
the processing unit further determines whether the current scale in which the road map is displayed in the display unit exceeds a scale threshold value,
the processing unit further determines a relation between weighted values assigned to the current road and the surrounding roads of the road map, or
the processing unit further determines a relative position-based spatial relation of the current road and the surrounding roads of the road map in the vicinity of the navigation device.

2. The navigation device as claimed in claim 1, wherein the processing unit fades the surrounding roads of the road map by showing the surrounding roads in phantom lines.

3. The navigation device as claimed in claim 1, wherein the processing unit fades the surrounding roads of the road map by showing the surrounding roads in a reduced level of brightness.

4. The navigation device as claimed in claim 1, wherein the processing unit fades the surrounding roads of the road map by showing the surrounding roads in a low contrast with the road map.

5. The navigation device as claimed in claim 1, wherein the processing unit fades the surrounding roads of the road map by showing the surrounding roads in a color gradient.

6. A navigation device control method applicable to a navigation device, comprising the steps of:
using a display unit to display at least one road map thereon, each of the road maps having a current scale and consisting of a current road and surrounding roads;
using a processing unit to determine whether a moving speed of the navigation device is larger than a speed threshold value; and
if the moving speed of the navigation device is larger than the speed threshold value, the processing unit controlling the display unit to adjust the road map by fading or not displaying the surrounding roads of the road map while only displaying the current road of the road map using one or more of the following criteria:
determining whether the current scale in which the road map is displayed in the display unit exceeds a scale threshold value,
determining the relation between weighted values assigned to the current road and the surrounding roads of the map, or
determining a relative position-based spatial relation of the current road and the surrounding roads of the road map in the vicinity of the navigation device.

7. The navigation device control method as claimed in claim 6, wherein the processing unit fades the surrounding roads of the road map by showing the surrounding roads in phantom lines.

8. The navigation device control method as claimed in claim 6, wherein the processing unit fades the surrounding roads of the road map by showing the surrounding roads in a reduced level of brightness.

9. The navigation device control method as claimed in claim 6, wherein the processing unit fades the surrounding roads of the road map by showing the surrounding roads in a low contrast with the road map.

10. The navigation device control method as claimed in claim 6, wherein the processing unit fades the surrounding roads of the road map by showing the surrounding roads in a color gradient.

* * * * *